Figure 1:
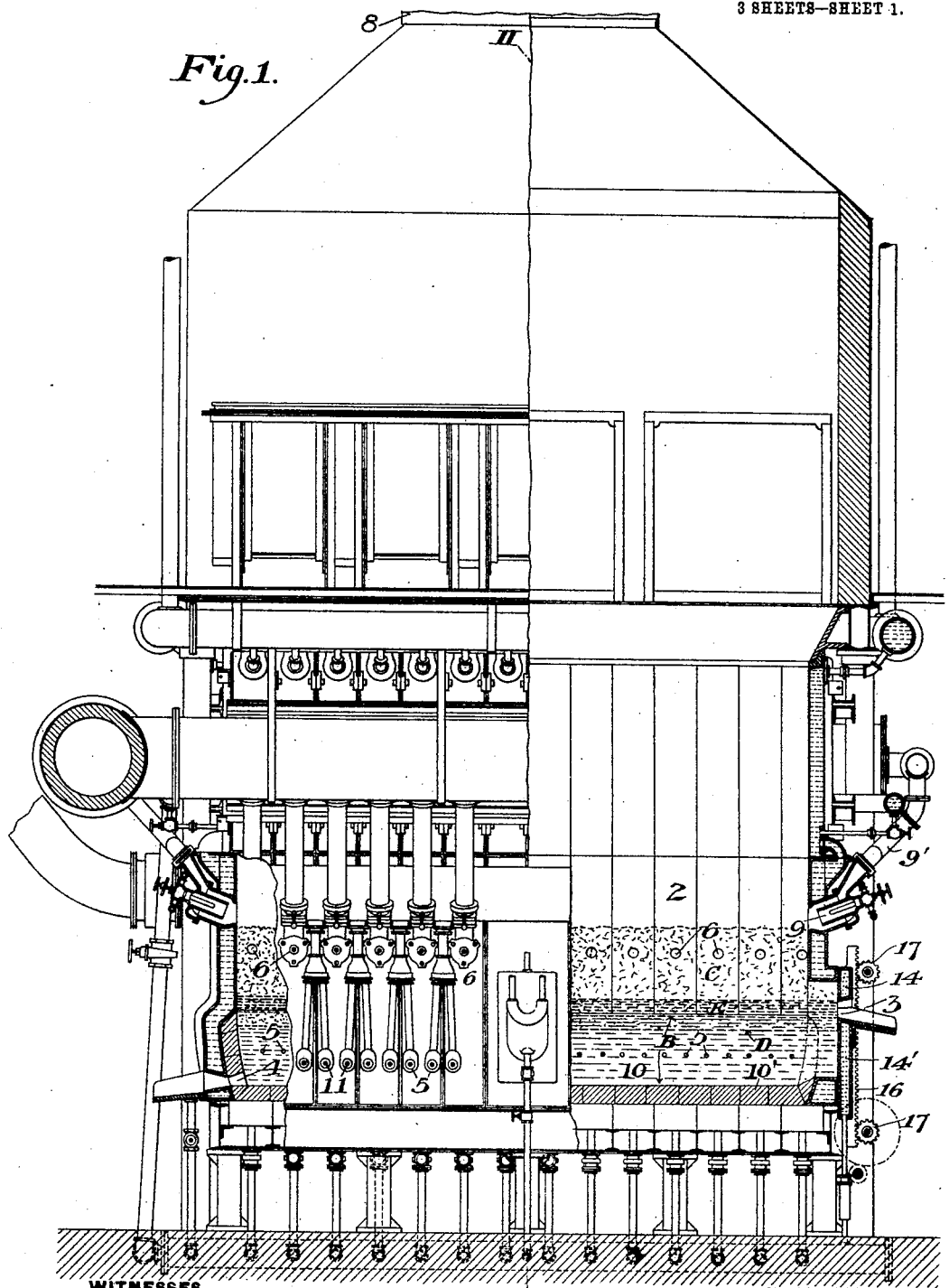

No. 803,737. PATENTED NOV. 7, 1905.
R. BAGGALEY.
FURNACE FOR SMELTING ORE.
APPLICATION FILED APR. 9, 1904.

3 SHEETS—SHEET 1.

WITNESSES
INVENTOR
Ralph Baggaley

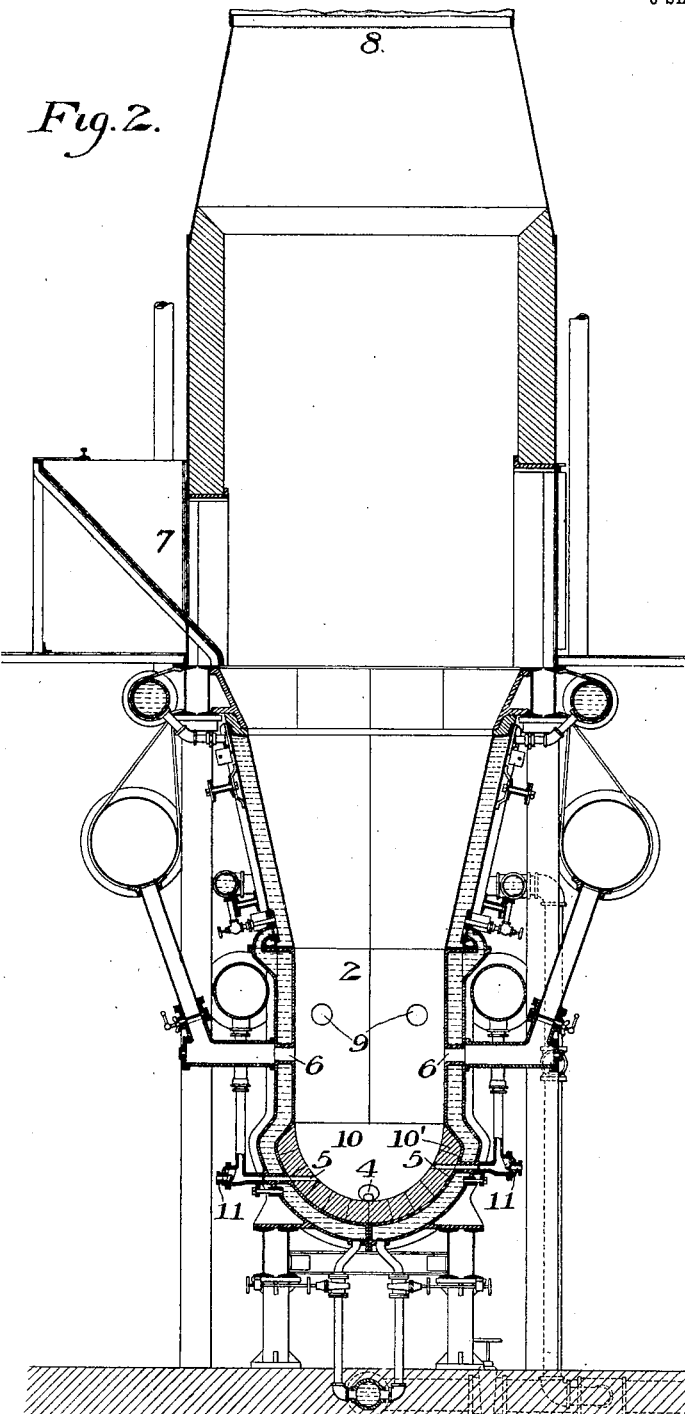

No. 803,737. PATENTED NOV. 7, 1905.
R. BAGGALEY.
FURNACE FOR SMELTING ORE.
APPLICATION FILED APR. 9, 1904.
3 SHEETS—SHEET 3.
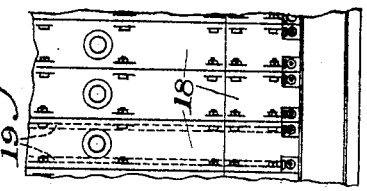
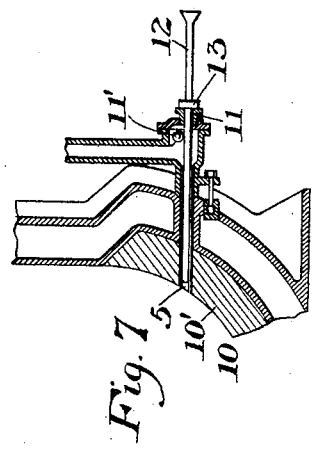
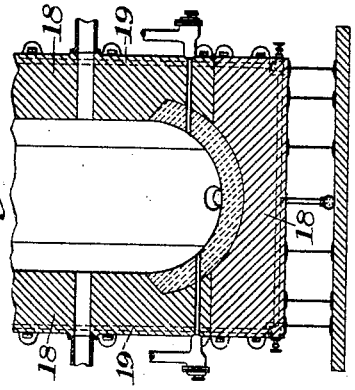
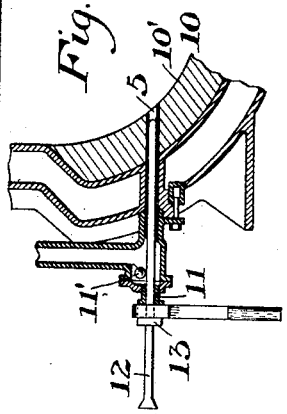
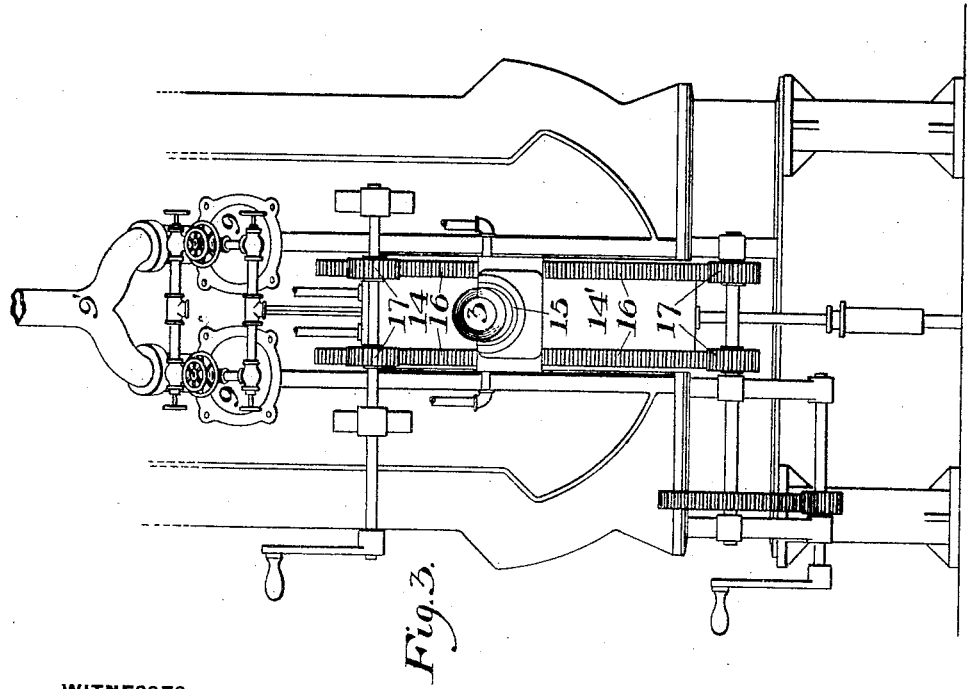
WITNESSES
INVENTOR
Ralph Baggaley
by Bakewell & Byrnes
his attys

UNITED STATES PATENT OFFICE.

RALPH BAGGALEY, OF PITTSBURG, PENNSYLVANIA.

FURNACE FOR SMELTING ORE.

No. 803,737.  Specification of Letters Patent.  Patented Nov. 7, 1905.

Application filed April 9, 1904. Serial No. 202,390.

*To all whom it may concern:*

Be it known that I, RALPH BAGGALEY, of Pittsburg, Allegheny county, Pennsylvania, have invented a Furnace for Smelting Ore, of which the following is a full, clear, and exact description, reference being had to the accompanying drawings, forming part of this specification, in which—

Figure 1 is a side elevation, partly in longitudinal section, of a furnace constructed in accordance with my invention. Fig. 2 is a vertical cross-section on the line II II of Fig. 1. Fig. 3 is a partial end elevation. Fig. 4 is a vertical cross-section showing a modification wherein the furnace is built with thick oblong metal blocks. Fig. 5 is a side elevation of part of the furnace-wall of Fig. 4, and Figs. 6 and 7 are detail views.

My invention relates to the apparatus described in a pending patent application filed by me on April 8, 1904, Serial No. 202,195, for a method of smelting ore and provides means for smelting ores of copper without need of previous water concentration and calcination by providing a body of molten matte in a furnace-chamber, charging a body of ore and coke in such limited quantity that it will float with its bottom above the level of the converting-twyers, and blowing air into the molten bath and into the floating charge. Heat is thus produced in the molten bath by rapid oxidation of the combustible elements by means of the blast. It is also produced in the floating charge above by combustion of the coke, and it may be also produced in my present apparatus by the combustion of oil or gas above the floating charge. These three sources of heat, one the heat of chemical combination within the bath at the base of the furnace, a second the oil or gas burners above the floating charge, and the third an intermediate source of heat in the body of the floating mass of coke and ore, are so intense that highly-refractory ores may be treated with success.

The apparatus is designed especially for practicing the method described and claimed in my said application; but it may also be employed in carrying into effect other processes of smelting ores.

Referring now to Figs. 1 and 2 of the drawings, 2 represents a furnace, the walls of which are made of hollow water-cooled metal plates. 3 is the slag-outlet; 4, the matte-outlet; 5 5, the converting-twyers, which enter the furnace near the bottom, and 6 6 the smelting-twyers, which enter above the level of the slag-outlet. The furnace has charging-openings 7, a stack 8, and oil or gas burners 9 9, which discharge into the furnace above the smelting-twyers. The bottom 10 of the furnace-chamber is concave and has a non-conducting lining 10′, of magnesite or the like, designed to receive and hold the greater part of the matte and prevent it from chilling when its percentage of values increases and its percentage of fuel components decreases. The heads of the twyers have openings 11 for the insertion of a bar and blast-plugs, the openings being normally closed by ball-valves 11′.

As a means of regulating and controlling the volume of blast delivered into the bath I use bars 12, Fig. 6, preferably made of iron, which I insert into any or all of the twyers at which I wish to shut off the blast. The bars are somewhat less in diameter than the twyers. For instance, if the twyer be one inch in diameter I may use a round bar seven-eighths inch in diameter or even three-quarters inch. The length of the bar is such that when the shoulder 13 engages the wind-box on the outside it will reach within an inch or half-inch of the point at the inside limit of the twyer-orifice where the blast enters the matte. By inserting such bar into the twyer-hole a small quantity of matte will chill against the bar at the inside end of the orifice, and the blast will be shut off from this one twyer. This small quantity of chilled matte—say one-half inch or one inch in thickness—will at once make an air-tight joint for the blast, a non-conducting protecting-layer for the end of the bar, and a seal against the escape of matte. The shoulder 13 on this bar is preferably made square, so that it may be turned with a wrench and so that the joint with the matte-plug may thus be ruptured and the bar removed. The matte seal or plug may then be removed whenever it is desired to reopen the twyer by using the ordinary punching-bar. If desired, the shoulder on the bar may be set one or two inches farther back, and a loop of the same width may be used inside the shoulder when the bar is inserted into the twyer. This loop (shown in Fig. 7) will admit of the bar being inserted into the twyer only the exact distance required, so that its end shall be one-half inch or one inch distant from the end of the twyer-hole. When it is desired to reopen the twyer, this bar can be driven in with a hammer as a means of rupturing the seal and for the removal of the bar from the twyer. By using these bars I am enabled, for instance, to close all the smelting and converting twyers without injury to the furnace or to its subsequent working. I can thus reduce the volume of blast at will. I can also quickly close the lower twyers when it is desired to shut off the blast preliminary to tapping the slag or matte.

In using the apparatus after having heated the furnace with flames from the burners 9 9 I supply it with a molten matte rich in oxidizable fuel-making constituents, such as sulfur and iron, &c. This matte is made by melting sulfid ores—i. e., ores high in matte-making elements and relatively low in silica. The matte thus provided constitutes a molten bath. It may be melted in the furnace itself or it may be supplied in molten condition from an outside source. The latter is better because when the charge is melted in the furnace with coke some of the coke will always remain unconsumed and this being enveloped in molten slag or matte will become infusible and will remain as an obstruction in the furnace, either on the bottom or, if eventually loosened by the action of the converting-twyers, it will float in an infusible state on the surface of the matte. If the first charge of molten matte has not been derived from a source outside of the furnace and if it has not been melted within the furnace-chamber with the heat supplied with the oil-burners, preferably from solidified matte or like material that is not likely to produce excessive proportions of slag—in other words, if the first charge has been melted within the furnace-chamber with solid fuel, such as coke or charcoal—I prefer opening the adjustable slag-spout described below and removing the remaining solid matter from the furnace-chamber into the forehearth, whereby I am enabled to commence the converting action with a clean bath of matte that is free from slag, unfused ore or matte, and infusible carbonaceous solid fuel, whether the same be floating on the surface or be in a sticky mass on the bottom in a position either to obstruct the converting-blast when started or, if this mass consists of slag, ore, and solid fuel, to be chilled through the action of the converting-blast. The furnace having been charged with a layer B of molten matte which fills the crucible or hearth up to the level of the slag tap or overflow and safely covers and thus protects the converting-twyers from slag, the operator then charges into the furnace a body C of ore, together later with a small percentage of coke—say about three per cent. of the latter. The ore is introduced and maintained in such limited volume that it will float in the bath B well above the converting-twyer level. Thus in Fig. 1 I show the ore-body as extending down to the level D. It is essential that the weight of the body of ore thus introduced should be restricted in this manner, because if it should be introduced in a mass of considerable size, as in processes heretofore attempted, its weight will force it down within the body of molten matte until its base extends below the converting-twyers. This obstructs the hearth or crucible, interferes with the operation of the converting-twyers, and causes slag to form at the level of these twyers. As the twyers are relied upon to supply the air which combines with the oxidizable elements of the matte and develops the necessary heat, the obstruction of the furnace by the chilled slag and ore would prevent successful operation and by causing the furnace to chill, especially after tapping off the matte, would bring the process to a stop. This will be understood by those skilled in the art, for it is well known that when the blast is delivered into pure matte it produces intense heat, while when it plays into slag, particularly when it is mixed with ore, it exerts a chilling effect. Blasts of air are introduced through the upper and lower rows of twyers. The air from the upper row of twyers acts upon the body of coke and ore, while the blast of air from the lower row of converting-twyers, being forced to play into pure matte alone, by combining with and oxidizing the combustible elements of the matte—such as the sulfur, iron, &c.—generates a high temperature in the bath. The heated bath acting upon the submerged portions of the ore dissolves the metallic sulfids therefrom, while the silica of the ore combining as a flux with the oxidized iron of the bath forms slag, which floats in a layer E and is drawn off through the slag tap or overflow.

At any time during the process the flames from the burners 9 9, supplied with air by a suitable blower acting through pipes 9', may be caused to play on the top of the charge and to apply an intense heat thereto, so that the furnace charge is at once subjected to the heat of chemical combination generated in the bath by the converting-twyers, the heat of combustion of coke with air supplied by the smelting-twyers, and the heat supplied by the burners 9 9. By the intense heat furnished conjointly from these sources I am able to treat in my furnace ores of highly-refractory character.

The operation of the furnace is thus continuous, the bath of matte being enriched by the blast and dissolving the ore which floats in it, the matte produced by smelting of the body of ore and coke above descending and becoming incorporated with that below.

The charges of ore are selected with reference to the condition of the matte and the temperature of the furnace. A portion of sulfid ore rich in matte-making elements, such as the ordinary pyrrhotite ore, should be introduced in order to supply the bath with fuel-making components, and charges of highly-silicious ores should be introduced to serve as a flux for the oxidized iron and to yield their values to the bath. These charges, with coke and with other fluxes, such as lime when necessary, are preferably fed to the bath alternately and in quantities as required; but they must not be fed in such quantities as to force the ore down to the bottom of the furnace or below the level of the converting-twyers.

As the bath of matte B accumulates portions are withdrawn for further treatment, care being taken to leave sufficient of it in the furnace to safely cover the converting-twyers to an ample depth to prevent the floating charge from approaching them.

Care must also be taken that the matte-bath shall not become too highly enriched—that is to say, its contents of sulfur, iron, and other fuel values must not become lessened to such an extent as to endanger the operation of the furnace by causing it to chill. For these reasons the matte should never be allowed to exceed sixty per cent. in values, and it should preferably not exceed forty per cent. Its condition in this regard can be regulated quickly and readily by changing the character of the ore introduced into the furnace. Thus if the matte should become too highly enriched sulfid ore containing relatively large proportions of sulfur and iron should be introduced, and when the matte is found by the operator to be low in values, and as a consequence the furnace is working hot, ores high in metal values and in silica and low in fuel values may be introduced with the charge. By thus changing the charge and by varying the volume of blast introduced at the twyers the operator is enabled to maintain perfect control over the working of the furnace. It will be apparent that when cold air is blown into a matte that consists of sixty per cent. or over of pure metal its effect will be the development of less heat, as the forty per cent. remaining fuel content of the matte is proportionately enfeebled in heat-producing power. I have found by experience that sixty per cent. is about the limit to which this concentration of metal can be carried and still continue the process of melting fresh additions. I have also found that after a converter charge has been tapped from the body of matte of a sixty per cent. grade fuel-bearing ores should immediately thereafter be supplied to the charge as a means of restoring the heat-producing power of the bath, so that it will thereafter be enabled to dissolve additional value-bearing ores. As soon as the grade of the matte has been materially lowered, and as a consequence its heat-producing power has been increased, other ores may be safely added as a means of recovering their contained values.

In Fig. 3 I show an adjustable slag-tap designed to permit the slag-opening to be enlarged when the slag is thick and viscous and when it needs to be raked or rabbled out of the furnace. In this case I provide above and below the slag-tap vertically-sliding water-cooled pieces 14 14', the adjacent ends of which form the limits of the slag-tap hole and one of which carries a slag-spout 15. These are moved vertically by a powerful mechanism—to wit, by racks 16 and pinions 17—and by thus moving the pieces 14 14' in opposite directions the slag-opening can be enlarged and ready access afforded for a rabbling-tool with which any sticky slag may be removed from the neighborhood of the water-jackets of which the pieces are composed. By lowering the spout the flow of the slag may be accelerated to any desired degree. By thus using water-jacketed pieces in this portion of the furnace I effectually prevent the inner skull or slag-lining from forming a bond with the inside of the jacket, and I am therefore enabled to move these pieces with the powerful mechanism above described.

In Fig. 4 I show a modification in which the furnace is constructed of thick cast-metal slabs or blocks 18, which may have passages 19 formed near their outer faces for the circulation of cooling streams of water, air under pressure, or simple air circulation. A furnace of this type will resist injury by the heat and corrosion of the contents and will prevent excessive losses of heat from the charge by conduction through the walls.

Within the scope of my invention as defined in the claims the parts may be modified, since

What I claim is—

1. A matte-furnace having converting-twyers near the bottom, smelting-twyers at a higher level, connections extending from the converting and smelting twyers to a source of air under pressure, and a burner supplying heat above the smelting-twyers; substantially as described.

2. A matte-furnace having a slag-outlet, converting-twyers below the slag-outlet, smelting-twyers above the same, connections extending from the converting and smelting twyers and supplying thereto air under pressure, and a burner supplying heat above the smelting-twyers; substantially as described.

3. A matte-furnace having converting-twyers near the bottom adapted to play into a clean body of molten matte, smelting-twyers above adapted to play into a floating charge, connections extending from the converting and smelting twyers and supplying thereto air under pressure, and a burner supplying heat above the smelting-twyers; substantially as described.

In testimony whereof I have hereunto set my hand.

RALPH BAGGALEY.

Witnesses:
J. H. REED,
THOMAS W. BAKEWELL.